July 20, 1965  J. RENEERKENS  3,195,682
LUBRICATING MEANS FOR BEARINGS
Filed Dec. 21, 1962  2 Sheets-Sheet 1
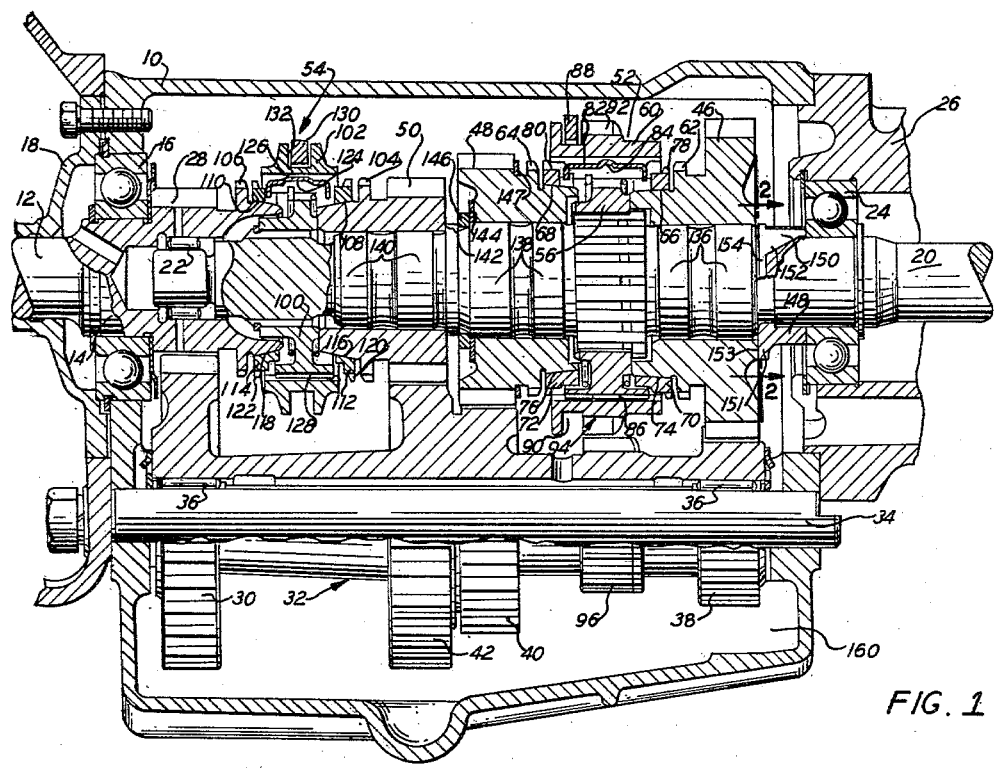
FIG. 1
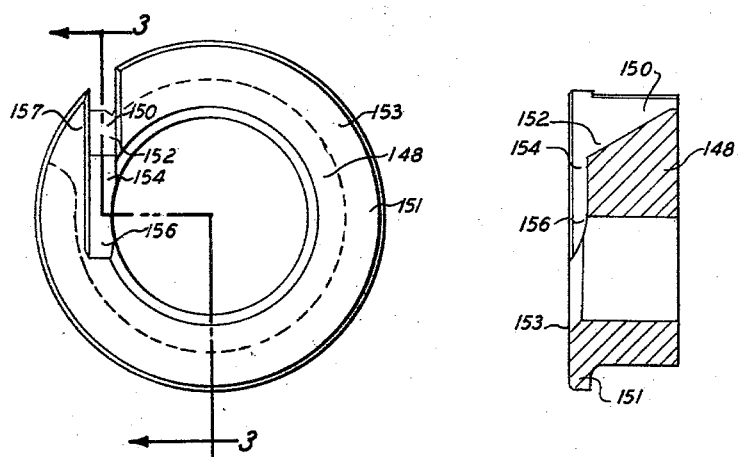
FIG.2
FIG.3
JOSEF RENEERKENS
INVENTOR
BY John R. Faulkner
Robert E. McCollum
ATTORNEYS

United States Patent Office 3,195,682
Patented July 20, 1965

3,195,682
LUBRICATING MEANS FOR BEARINGS
Josef Reneerkens, Bensberg-Refrath (Rhine), Germany, assignor to Ford Motor Company, Dearborn, Mich., a corporation of Delaware
Filed Dec. 21, 1962, Ser. No. 246,606
13 Claims. (Cl. 184—11)

This invention relates to apparatus for lubricating the bearing surface of a rotatably mounted transmission drive gear.

In conventional multispeed manual shift transmissions that are fully synchronized, a number of gears of different diameters are journaled on the power output shaft and selectively connected to it by clutch synchronizers for effecting different drive ratios. The gears are constantly meshed and driven by countershaft mounted gears rotated at all times from a power input shaft. The lowest speed gear therefore rotates at a speed considerably slower than the input and output shafts when they are directly connected, such as when the transmission is conditioned for a direct drive. Proper lubrication of the low gear bearing is therefore essential to prevent damage to the gear or the shaft.

Lubrication is generally provided by partial immersion of the cluster gear in a lubricant which is picked up and transferred to the teeth of the low speed gear and thrown outwardly against the walls and top of the housing by the gears to fall by gravity onto the parts to be lubricated. However, in the case of the lowest speed gear, the small diameter of the cluster gear element driving it and the resultant slow rotation of the low speed gear may not supply adequate lubricant to the low gear bearing at all times, and especially at a time when the speed differential between the gear and output shaft is greatest.

Therefore, it is an object of the invention to provide apparatus for lubricating the bearing of a gear rotatably mounted on a shaft regardless of the speed differential therebetween.

It is also an object of the invention to provide a gear locating and bearing lubricating apparatus consisting of a sleeve secured to the shaft upon which the gear is rotatably mounted, the sleeve having not only a bearing surface abutting the gear to axially locate it, but also lubricant pump means for supplying lubricant directly to the gear bearing.

It is a still further object of the invention to provide a multispeed manual shift synchronized transmission construction having a sleeve rotatable with the power output shaft, the sleeve having a bearing surface abutting and locating the low speed gear and being constructed with a tapered scoop for directing lubricant to the gear bearing surface.

It is also an object of the invention to provide the walls of a countershaft type transmission housing with a number of oil or lubricant dams cooperating together to trap lubricant in a manner providing the best distribution to the gear bearings.

Other objects, features and advantages of the invention will become apparent upon reference to the succeeding detailed description thereof and to the drawings illustrating the preferred embodiments thereof; wherein, FIGURE 1 is a cross-sectional view of a transmission embodying the invention;

FIGURE 2 is an enlarged cross-sectional view taken on a plane indicated by and viewed in the direction of the arrows 2—2 of FIGURE 1;

FIGURE 3 is a cross-sectional view taken on a plane indicated by and viewed in the direction of the arrows 3—3 of FIGURE 2;

Figure 4:
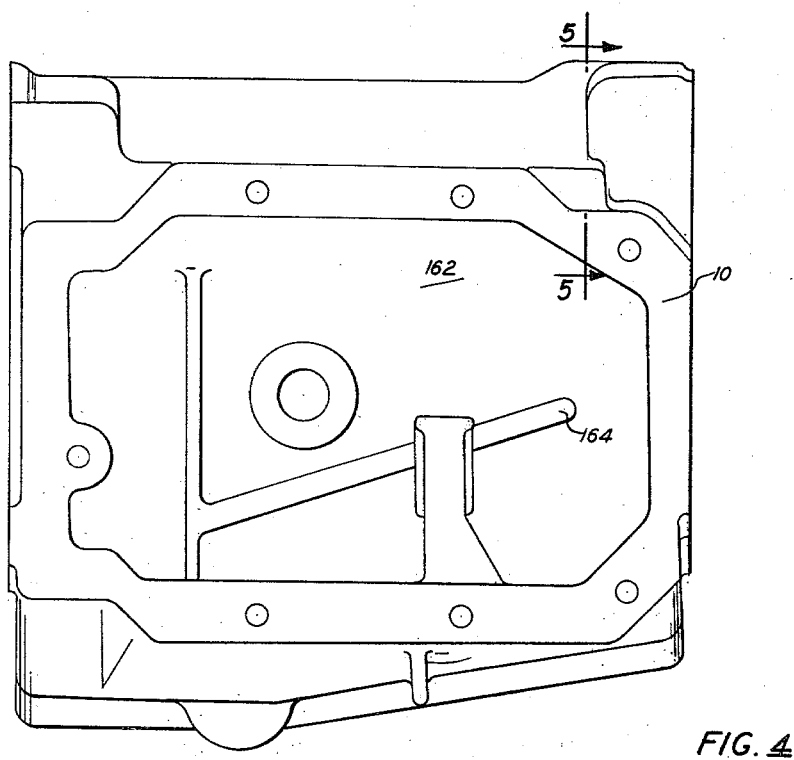
FIGURE 4 is a side elevational view of a portion of the transmission housing of FIGURE 1; and, FIGURE 5 is an enlarged cross-sectional view of a detail of FIGURE 4 taken on a plane indicated by and viewed in the direction of the arrows 5—5.

FIGURE 1, which is essentially to scale, shows a manually operated, four-speed, fully synchronized transmission enclosed in a housing 10. A power input shaft 12 projects into one end of the housing, and has an enlarged sleeve shaft portion 14 rotatably supported on a bearing 16. The bearing is supported on the housing by a retainer 18. The sleeve shaft rotatably supports the forward end of an output or driven shaft 20 on bearings 22, the opposite end being rotatably mounted within the transmission housing by means of a bearing 24 and a retainer 26.

The sleeve shaft 14 is formed with a gear 28 drivably meshing with a gear 30 defining one element of a cluster gear 32. The cluster gear is rotatably mounted on a countershaft 34 by means of bearings 36, the countershaft being secured in the transmission housing. Cluster gear 32 includes forward drive gear elements 38, 40, and 42 drivingly meshed respectively with a low speed gear 46, a second speed gear 48, and a third speed gear 50 all rotatably mounted on driven shaft 20. The gears 46, 48, 50, and 28 are individually connected to output shaft 20 by means of two clutch synchronizers 52 and 54.

The first and second speed synchronizer 52 has a hub 56 internally splined to shaft 20, and externally splined to an axially movable clutch sleeve 60. The gears 46 and 48 are formed with clutch teeth 62 and 64 and external conical friction surfaces 66 and 68. Blocker rings 70 and 72 are rotatably disposed about the clutch surfaces 66 and 68, and have internal mating conical clutch surfaces 74 and 76. The rings are also formed with external teeth 78 and 80. The clutch sleeve 60 can be moved axially to engage either the clutch teeth 62 or 64. A thrust bar 82 is slidably mounted in a groove on hub 56 and has a detent 84 frictionally engaging sleeve 60. The thrust bar is actuated by the sleeve and is adapted to apply an axial clutching force to either of the blocker rings 70 or 72. A clutching action between the blocker ring and the associated cone clutch surfaces establishes synchronization between shaft 20 and gear 46 or 48 at a time prior to engagement of the gear clutch teeth by the internal spline teeth 86 on the synchronizer sleeve.

The sleeve 60 is moved by a shifter fork 88 engaged in a groove 90. Movement of the sleeve to the right, for example, to the first or low speed forward drive position, moves blocker ring 70 to engage conical surfaces 66 and 74. This establishes synchronism between shaft 20 and gear 46. Clutch teeth 78 on the blocker ring and teeth 62 on the gear 46 are then engaged with the teeth 86 on sleeve 60, and gear 46 is locked to shaft 20. A power path is therefore provided from input shaft 12, gears 28, 30, 38, and 46 to synchronizer hub 56 and output shaft 20.

A similar action occurs when the clutch sleeve 60 is moved to the left to the second speed position to lock gear 48 to shaft 20. A power path is then established from shaft 12 to output shaft 20 through gears 28, 30, 40, and 46, and hub 56.

In its neutral position, synchronizer 52 can establish a reverse drive. The clutch sleeve 60 has gear teeth 92 defining a reverse gear 94, the gear being radially aligned with a reverse gear element 96 on cluster gear 32. A reverse idler pinion (not shown) is slidably mounted on a shaft parallel to countershaft 34 and is capable of being moved axially into meshing engagement with both gears 94 and 96 to establish a reverse drive when desired. The power flow path would then be established from input shaft 12 to output shaft 20 through gears 28, 30, and 96, the reverse idler gear, gear 94 and synchronizer hub 56 to rotate shaft 20 in a reverse direction at a reduced speed.

For engaging the third or fourth speed gears 50 or 28 to output shaft 20, synchronizer 54 is constructed similar to synchronizer 52 with a hub 100 internally splined to shaft 20 and externally splined to an axially movable clutch sleeve 102. The gear elements 50 and 28 are formed with clutch teeth 104 and 106 and external conical friction surfaces 108 and 110 having blocker rings 112 and 114 rotatably disposed thereabout. The rings have internal mating conical clutch surfaces 116 and 118 and external teeth 120 and 122.

A thrust bar 124 is slidably mounted in a groove on hub 100 and frictionally engages a detent in sleeve 102. A clutching action between the blocker ring and the associated cone clutch surfaces upon movement of the sleeve and thrust bar establishes synchronization between shaft 20 and gear 50 or 28 at a time prior to engagement of the gear clutch teeth by the internal spline teeth 128 on the synchronizer sleeve.

The sleeve 102 is moved by a shifter fork 130 engaged in a groove 132. Movement of the sleeve to the right in FIGURE 1 to the third speed forward drive position moves blocker ring 112 to engage the conical surface of gear 50 to establish synchronism between shaft 20 and this gear. The blocker ring clutch teeth 120 and the gear clutch teeth 104 are then engaged with the teeth 128 on sleeve 102, and gear 50 is locked to shaft 20. A torque path is thus established from input shaft 12 to shaft 20 through gears 28, 30, 42, and 50, and synchronizer sleeve 102.

A similar action occurs when the sleeve 102 is moved to the left to the fourth speed forward or direct drive position to lock gear 28 directly to shaft 20. That is, a torque path is established from input shaft 12 directly to output shaft 20 through gear 28 and synchronizer clutch sleeve 102.

Suitable interlock mechanism (not shown) is provided to prevent engagement of any specific gear by a synchronizer without first moving the other synchronizer to a neutral position.

Thus it will be seen that a fully synchronized transmission is provided that establishes four forward speed drives, neutral, and a reverse drive.

As shown, the gears 46, 48, and 50 are rotatably mounted on shaft 20 on bearing surfaces or journals 136, 138, and 140. The gear 50 is axially located on the shaft by abutment at one edge against the synchronizer hub 100, and at its opposite edge against a shoulder 142 on shaft 20. Gear 48 is similarly located axially between a thrust washer 144 and a snap ring 146 at one edge, and against a thrust washer 147 adjacent synchronizer hub 56. Low speed gear 46 is axially positioned against the synchronizer hub 56 at one edge, and at its opposite edge against a sleeve 148 spacing the gear from the bearing 24.

Sleeve 148 is fixed to shaft 20 and has a flange 151 with a bearing surface 153 abutting the side face of gear 46. Thus, the sleeve serves not only as a spacer, but as a bearing to permit rotation of gear 46 relative thereto. Additionally, the sleeve is constructed in a manner to be described to be effective as a fluid pump to provide adequate lubrication of the bearing for gear 46 at all times.

As best seen in FIGURES 2 and 3, the sleeve 148 is provided with a tapering groove or fluid passage 150 of constant width diverging axially towards the hub of gear 46. The longitudinal axis of the groove is tangentially located with respect to the inner diameter of the sleeve and extends in a straight line path to the outer diameter. The portion 152 closest to the sleeve axis is intersected by a slot 154 parallel to the side face of gear 46 and arcuately faired at its terminal edge 156 adjacent the journal bearing 136. The sleeve is enlarged at 157 in the form of a cam to compensate for the unbalance of the sleeve. Lubricant is supplied to the passage 150 from a sump 160 which contains oil, for example, to a level partially immersing the cluster gear 32. Upon rotation of the cluster gear, the oil picked up by the gear elements and gears meshed therewith is thrown outwardly against the walls and top of the housing 10 to drop by gravity towards the gear hubs and shaft 20 and bearings and into sleeve passage 150. The quantity of oil thrown outwardly will of course vary as a function of the speed of the gear elements and gears.

Since the slowly rotating gear 46 and gear element 38 may not at times provide an adequate supply of oil to the sleeve passage 150, the housing 10 is formed with two oil dams or ridges which build the oil level to a thickness where it can be picked up by the low speed gear teeth. As seen in FIGURE 4, the inner wall 162 of the housing has a ridge 164 projecting towards the gearing, the ridge being above the level of the oil in sump 160 and slanted parallel to a line passing through the outer peripheries of gears 50, 48, and 46. The ridge 164 is on the ascending side of the gears and projects inwardly enough so that oil thrown against it by the cluster gear elements is dammed up to a thickness where it is picked up by the teeth of gears 50, 48, and 46 and cast upwardly to the top of the housing to fall onto the portions to be lubricated.

Figure 5:
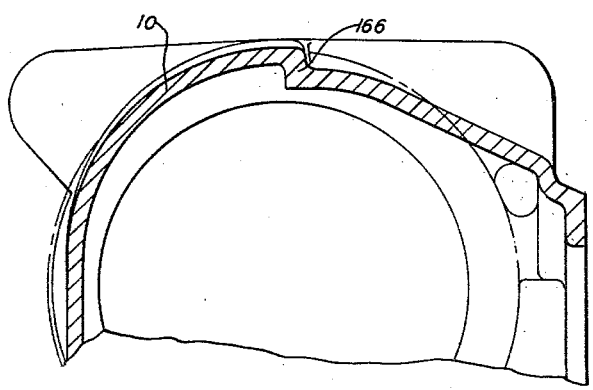

With respect to the low speed gear 46, the portion of the housing over sleeve 148 is provided with an oil dam or ridge 166 (FIGURE 5) projecting radially inwardly. Dam 166 acts to trap the oil cast upwardly by the gears so that it will fall directly into the path of passage 150 in the sleeve. That is, the dam tears the oil film off the inner wall of the casing. It is to be noted that the slant of ridge 164 aids the supply of oil to the area adjacent gear 46 since the centrifugal force on the oil causes it to move up the incline to some degree.

In operation, therefore, rotation of the gearing causes oil to be picked up by the cluster gear elements and thrown outwardly against the housing walls where it is dammed up against ridge 164 to a thickness where it can be picked up by gears 46, 48, and 50. The oil is then picked up by the driven gears and thrown upwardly along the curved side and top of the housing, where it falls by gravity to the locations to be lubricated. In the case of gear 46, the oil thrown upwardly is trapped by ridge 166, whereupon it falls downwardly towards sleeve 148. The rapidly rotating sleeve passage 150 thereupon scoops the oil into the passage where it is pumped to the slot or recess 154 and directly to the bearing 136 for gear 46.

Thus, the low speed gear bearing is maintained properly lubricated at all times, and especially at times when it is most desired; that is, when a considerable speed differential exists between gear 46 and shaft 20.

Thus, it will be seen that the invention provides a simple sleeve construction that not only serves as a spacer member, but also functions as a bearing member and a lubricant pump.

While the invention has been illustrated in its preferred embodiment in a transmission of the construction shown in FIGURE 1, it will be clear to those skilled in the art to which the invention pertains that it would have use in many installations other than that shown, and that many changes and modifications may be made thereto without departing from the scope of the invention.

I claim:

1. In a transmission having a rotatable shaft and a gear rotatably mounted on bearing means on said shaft, means for lubricating said bearing means, said means including fluid pumping means secured to and rotatable with said shaft, a source of lubricating fluid connected to said pumping means, and means on said pumping means directing said fluid to said bearing means, said latter means including a slot extending across the periphery of said pumping means and being inclined towards said bearing means, said slot along its length being open to communication with said lubricating fluid.

2. In a transmission having a rotatable shaft and a gear rotatably mounted on bearing means on said shaft, means for lubricating the said bearing means, said means including fluid scoop means secured to and rotatable with said shaft, means supplying said scoop means with lubricating fluid, said scoop means having portions thereof directing said fluid to said bearing means, said portions including a slot extending across the periphery of said scoop means and being inclined towards said bearing means, said slot along its length being open to communication with said lubricating fluid.

3. In a transmission having a rotatable shaft and a gear rotatably mounted on bearing means on said shaft, means for lubricating said bearing means, said means including fluid scoop means secured to and rotatable with said shaft, means supplying said scoop means with lubricating fluid, and passage means between said scoop means and said bearing means conveying lubricating fluid thereto, said passage means including a slot extending across the periphery of said scoop means and being inclined towards said bearing means, said slot along its length being open to communication with said lubricating fluid.

4. In a transmission having a rotatable shaft and a gear rotatably mounted on bearing means on said shaft, a sleeve secured to said shaft having a bearing surface abutting one side of said gear for axially locating said gear in one direction, said sleeve having fluid scoop means therein connected at one portion to said bearing means and at another portion to a source of lubricating fluid for lubricating said bearing means upon rotation of said shaft, said another portion comprising a slot extending across the periphery of said scoop means and being inclined towards said bearing means, said slot along its length being open to communication with said lubricating fluid.

5. A transmission having input and output shafts, a housing surrounding said shafts, and means connecting said shafts, said means including a reduction drive gear train having a driving gear secured to said input shaft and a driven gear rotatably mounted on bearing means on said output shaft, a fluid sump, a countershaft rotatably mounting a cluster gear thereon having gear elements engaging and rotating said gears, said gear elements being partially immersed in the fluid in said sump, and fluid scoop means secured to said output shaft and communicating with said bearing means for lubricating the same, rotation of said cluster gear and gears centrifuging the fluid from said sump outwardly against said housing to fall into said scoop means.

6. A transmission having input and output shafts and means connecting said shafts, said means including a reduction drive gear train having a driving gear secured to said input shaft and a driven gear rotatably mounted on bearing means on said output shaft, a fluid sump, a countershaft rotatably mounting a cluster gear thereon having gear elements engaging and rotating said gears, said gear elements being partially immersed in the fluid in said sump, and fluid scoop means secured to said output shaft and communicating with the said bearing means for lubricating the same, rotation of said cluster gear elements centrifuging the fluid from said sump outwardly adjacent said driven gear and scoop means, and oil dam means in the path of said fluid and adjacent said scoop means for directing said fluid towards said scoop means for lubricating said bearing means.

7. A transmission having input and output shafts and means connecting said shafts, said means including a reduction drive gear train having a driving gear secured to said input shaft and a driven gear rotatably mounted on bearing means on said output shaft, a fluid sump, a countershaft rotatably mounting a cluster gear thereon having gear elements engaging and rotating said gears, said gear elements being partially immersed in the fluid in said sump, and fluid scoop means secured to said output shaft and communicating with said bearing means for lubricating the same, rotation of said cluster gear centrifuging the fluid from said sump outwardly adjacent said driven gear and scoop means, and lubricant dam means in the path of said fluid and adjacent said scoop means for directing said fluid into said scoop means, said dam means comprising a first lubricant dam adjacent one portion of said driven gear for increasing the thickness of said lubricant to a level in contact with said driven gear whereby the lubricant is further centrifuged to a position above said scoop means, and a second lubricant dam at said position directing said lubricant towards said scoop means.

8. A transmission having input and output shafts and means connecting said shafts, said means including a reduction drive gear train having a driving gear secured to said input shaft and a driven gear rotatably mounted on bearing means on said output shaft, a countershaft rotatably mounting a cluster gear engaging said gears for rotating said driven gear at speeds other than at the speed of said input shaft, means at times connecting said driven gear and driven shaft for providing one reduction drive speed ratio, means at times engaging said input and output shafts for a direct drive therebetween, and means for lubricating said bearing means, said last-named means including a sleeve secured to said output shaft having a bearing surface abutting said driven gear, said sleeve having a fluid passage intersecting the inner and outer sleeve peripheral portions and being tangentially arranged with respect to said inner peripheral portion, said passage diverging towards said bearing means, means communicating lubricating fluid to the outer portion of said passage, and means directing fluid from the inner portion of said passage to the bearing means to lubricate the same upon rotation of said shaft and gears.

9. A transmission having input and output shafts, a housing surrounding said shafts, and means connecting said shafts, said means including a reduction drive gear train having a driving gear secured to said input shaft and a driven gear rotatably mounted on bearing means on said output shaft, a fluid sump, a countershaft rotatably mounting a cluster gear having gear elements engaging said gears for rotating said driven gear at speeds other than at the speed of said input shaft, means as times connecting said driven gear and driven shaft for providing one reduction drive speed ratio, means at times engaging said input and output shafts for a direct drive therebetween, and means for lubricating said bearing means, said last-named means including a sleeve secured to said output shaft having a bearing surface abutting said driven gear, said sleeve having a fluid passage intersecting the inner and outer sleeve peripheral portions and being tangentially arranged with respect to said inner peripheral portion, said passage diverging towards the hub of said driven gear and bearing means, and means directing the fluid from the inner portion of said passage to the bearing means upon rotation of said shaft and gear elements and gears, said gear elements being partially immersed in the fluid in said sump, rotation of said cluster gear elements and gears centrifuging the fluid from said sump outwardly against said housing to fall into said passage.

10. A transmission having input and output shafts and means connecting said shafts, said means including a reduction drive gear train having a driving gear secured to said input shaft and a driven gear rotatably mounted on bearing means on said output shaft, a fluid sump, a countershaft rotatably mounting a cluster gear thereon having gear elements engaging said gears for rotating said driven gear at speeds other than at the speed of said input shaft, said gear elements being partially immersed in said sump, means engaging said input and output shafts for a direct drive therebetween, and means for lubricating said bearing means, said last-named means including a sleeve secured to said output shaft having a bearing surface abutting said driven gear, said sleeve having a fluid passage intersecting the inner and outer sleeve peripheral portions and being tangentially arranged with respect to said inner peripheral portion, said passage diverging towards said driven gear, rotation of said cluster gear elements centrifuging the fluid from said sump outwardly adjacent said driven gear and passage, and lubricant dam means in the path of said fluid for directing said fluid into said passage.

11. A transmission having input and output shafts and means connecting said shafts, said means including a reduction drive gear train having a driving gear secured to said input shaft and a driven gear rotatably mounted on bearing means on said output shaft, a fluid sump, a countershaft rotatably mounting a cluster gear thereon having gear elements engaging said gears for rotating said driven gear at all times at a speed other than at the speed of said input shaft, said gear elements being partially immersed in said sump, means engaging said input and output shafts for a direct drive therebetween, and means for lubricating the hub of said driven gear and said bearing means, said last-named means including a sleeve secured to said output shaft having a bearing surface abutting said driven gear, said sleeve having a fluid scoop passage intersecting the inner and outer sleeve peripheral portions and being tangentially arranged with respect to said inner peripheral portion, said passage diverging towards the hub of said driven gear, rotation of said cluster gear elements centrifuging the fluid from said sump outwardly adjacent said driven gear and passage, and lubricant dam means in the path of said fluid for directing said fluid into said passage for lubricating said hub, said dam means comprising a first lubricant dam adjacent one portion of said driven gear for increasing the thickness of said lubricant to a level to be contacted by said driven gear whereby the lubricant is further centrifuged to a position above said scoop passage, and a second lubricant dam at said position directing said lubricant towards said scoop means.

12. In a transmission having a rotatable shaft and a gear rotatably mounted on bearing means on said shaft, means for lubricating said bearing means, said means including fluid scoop means secured to and rotatable with said shaft, means supplying said scoop means with lubricating fluid, and passage means between said scoop means and said bearing means conveying lubricating fluid thereto, said passage means including a slot extending axially across the periphery of said scoop means and diverging radially towards said bearing means, said slot along its length being open to communication with said lubricating fluid.

13. A lubricating means as recited in claim 12, and further means connecting the fluid in said slot to said bearing means.

References Cited by the Examiner

UNITED STATES PATENTS 2,247,732 7/41 Paton _____ 184—6
2,487,350 11/49 Markland _____ 184—11

FOREIGN PATENTS 679,402 9/52 Great Britain.

LAVERNE D. GEIGER, *Primary Examiner.*
MILTON KAUFMAN, *Examiner.*